United States Patent [19]

DeJager et al.

[11] Patent Number: 4,921,320
[45] Date of Patent: May 1, 1990

[54] OPTICAL SCANNER

[75] Inventors: Donald DeJager; David Kessler, both of Rochester, N.Y.

[73] Assignee: Eastman Kodak Company, Rochester, N.Y.

[21] Appl. No.: 248,467

[22] Filed: Sep. 22, 1988

[51] Int. Cl.⁵ ............................................. G02B 26/10
[52] U.S. Cl. .................................... 350/6.8; 350/6.5
[58] Field of Search ............... 350/6.8, 479, 6.5, 6.6, 350/6.7, 6.9, 6.91; 250/236; 358/63, 199

[56] References Cited

U.S. PATENT DOCUMENTS

| | | | |
|---|---|---|---|
| 3,505,658 | 4/1970 | Fan et al. | 350/6.7 |
| 3,946,150 | 3/1976 | Grafton | 178/6.7 R |
| 4,247,160 | 1/1981 | Brueggemann | 350/6.8 |
| 4,274,703 | 6/1981 | Fisli | 350/6.8 |
| 4,277,128 | 7/1981 | Kawamura | 350/6.8 |
| 4,379,612 | 4/1983 | Matsuoka et al. | 350/6.8 |
| 4,512,625 | 4/1985 | Brueggemann | 350/6.8 |
| 4,796,962 | 1/1989 | DeJager et al. | 350/6.8 |
| 4,818,046 | 4/1989 | Kondo | 350/6.8 |

Primary Examiner—Bruce Y. Arnold
Assistant Examiner—Loha Ben
Attorney, Agent, or Firm—Donald D. Schaper

[57] ABSTRACT

An optical scanner is disclosed for scanning a light beam onto a receiving medium. The scanner includes a rotatable polygon for receiving a light beam from a source and for scanning the beam through a predetermined angle, and optical elements between the polygon and receiving medium for directing the beam to the receiving medium. In order to provide a very high resolution scanner which can be used to generate halftone images, the optical elements include a first lens element having two spherical surfaces, a second lens element which has orthogonal cylindrical surfaces, and a cylindrical mirror.

8 Claims, 1 Drawing Sheet

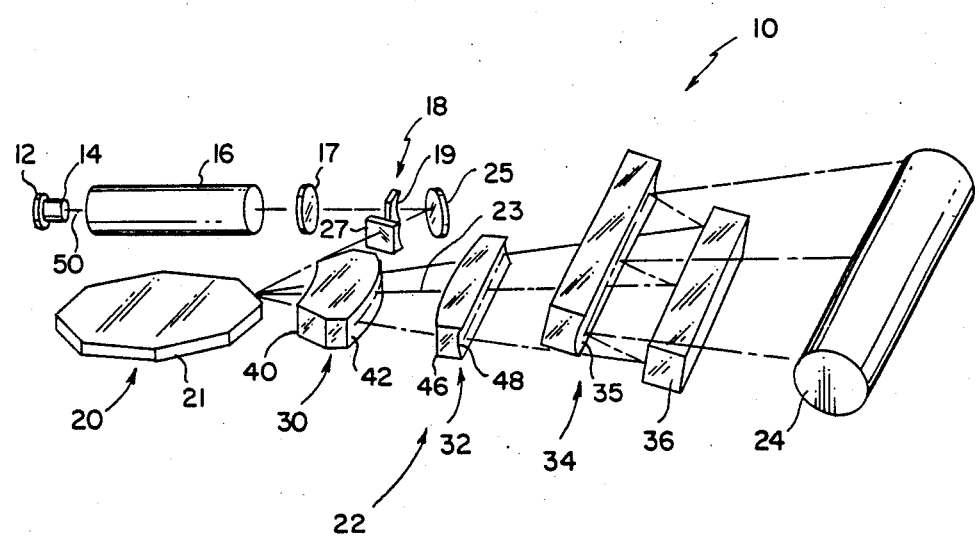

OPTICAL SCANNER

CROSS REFERENCE TO RELATED APPLICATION

Reference is made to commonly-assigned patent application, Ser. No. 029,003, entitled Optical Scanner, filed on Mar. 23, 1987, in the names of D. DeJager and D. Kessler, now U.S. Pat. No. 4,796,962.

1. Field of the Invention

The present invention relates to an optical scanner, and more particularly, to an optical scanner which is particularly suitable for use in a high resolution laser scanner.

2. State of the Prior Art

Optical scanners of a type which are used in laser printers generally include a rotatable polygon which is used to scan a light beam across a receiving medium. The optical elements used in such scanners are designed to achieve a flat tangential field for good beam focus and to correct for so-called pyramidal errors, that is, spot position errors in the cross-scan direction resulting from angular misalignment of the facets on the polygon; the optical elements must also produce a relatively straight scan line and correct for the f-$\theta$ distortion condition. The receiving medium in the scanners can be a photographic film or a photosensitive medium such as a xerographic drum.

In U.S. Pat. No. 4,247,160, there is disclosed a laser beam scanner having a concave cylinder mirror located between the polygon and the photosensitive surface. The concave cylinder mirror, which has positive power in the cross-scan direction but has no power in the scan direction, minimizes pyramidal errors. A negative refractive cylinder lens, with power in the cross-scan plane, is placed between the cylinder mirror and the polygon to compensate for residual cross-scan field curvature. A positive lens is placed between the cylinder mirror and the polygon to focus the beam and produce a flat tangential field.

In U.S. Pat. No. 4,512,625, a lens system is described in which a concave cylinder mirror is used to compensate for pyramidal errors. Two lens elements are used between the cylinder mirror and a rotating polygon. One of the lens elements has negative spherical power, and the other lens element has negative cylindrical power in the cross-scan direction on the front surface and positive spherical power on the rear surface. One of the main problems with the lens systems disclosed in this patent and in U.S. Pat. No. 4,247,160, is that the resolution obtained in these systems is not high enough for use in certain applications, such as, for example, in the production of half-tone images.

SUMMARY OF THE INVENTION

It is an object of the present invention to overcome the problems in the prior art discussed above and to provide an improved optical scanner.

In accordance with the present invention, there is provided an optical scanner for scanning a light beam generated by a light source onto a receiving medium, the scanner comprising: deflector means for scanning the beam through a predetermined angle; and optical means interposed between the deflector means and the receiving medium, the optical means comprising a first lens element having two spherical surfaces, a second lens element having two cylindrical surfaces which are oriented perpendicular to each other, and a cylindrical mirror.

In the preferred embodiment of the present invention, a rotatable polygon is used to deflect a laser beam through a predetermined angle, and a concave cylinder mirror is placed between the polygon and a receiving medium. Two refracting scan lens elements are placed in the optical path between the polygon and the cylinder mirror; one of the lens elements has two spherical surfaces and the other lens element has orthogonal cylindrical surfaces. An input beam from a light source, such as a diode laser, is passed through beam-shaping optics and is directed to the rotatable polygon. After reflection at the polygon, the beam passes through the two refracting scan lens elements and is then directed to the cylinder mirror by a plano mirror. The cylinder mirror directs the beam onto the receiving medium.

A principal advantage of the optical scanner of the present invention is that it produces a very high resolution image. The scanner has a very flat tangential field, and the laser beam is of a small enough size at the receiving medium, in both scan and cross-scan directions, to make the scanner suitable for creating half-tone images of good quality.

Other features and advantages will become apparent with reference to the following description of the preferred embodiments and read in light of the attached drawing.

BRIEF DESCRIPTION OF THE DRAWING

The drawing shows a perspective view of the optical scanner of the present invention.

DESCRIPTION OF THE PREFERRED EMBODIMENT

With reference to the drawing, there is shown an optical scanner 10 constructed in accordance with the present invention. Scanner 10 comprises a diode laser 12 which serves as a light source, a collimator lens 14, a beam expander 16, a beam shaper system 18, a rotating polygon 20, and an optical system 22 between the polygon 20 and a receiving medium 24. Beam shaper system 18 includes a spherical lens 17, a positive cylinder lens 19, a negative cylinder lens 27, and a plano mirror 25 between lenses 19 and 27. The optical system 22 is disposed along an optical axis 23 and comprises two refracting scan lens elements 30 and 32 and a cylindrical mirror 34. Optical system 22 also includes a plano mirror 36 which is used between lens element 32 and mirror 34 to fold the light beam.

The lens element 30 is a thick meniscus lens element having two spherical surfaces 40 and 42. Surface 40 has a negative power and surface 42 has a positive power. The optical power of element 30 is very slightly positive. Lens element 32 has two cylindrical surfaces 46 and 48 which have their respective cylinder axes (not shown) oriented perpendicular to each other; both of the axes are also set perpendicular to the optical axis 23 which is defined by the first lens element 30. Surface 46 of lens element 32 has positive cylindrical power in the scan direction. Surface 48 of element 32 has negative cylindrical power in the cross-scan direction. Thus, the power of element 32 is positive in the scan direction and is negative in the cross-scan direction. The cylinder mirror 34 has a positive cylindrical power in the cross-scan direction, and the axis of the cylinder mirror is perpendicular to the optical axis 23.

Diode laser 12 produces an infrared laser beam 50 which is anamorphically shaped by the beam shaper system 18 before the beam is directed onto the polygon 20. In the cross-scan direction, beam 50 comes to a waist focus in the near vicinity of a polygon facet 21. In the scan direction, beam 50 is converging towards a waist focus located at about 720 mm beyond the polygon 20. Thus, in the scan direction, the input beam at the polygon 20 is not collimated but has a positive vergence. Beam 50, after reflection at the polygon 20 and after having passed through the two lens elements 30 and 32, is reflected again at the cylinder mirror 34 and comes to a waist focus at, or in the near vicinity of, the receiving medium 24. In the scan direction, the waist focus stays within ±0.13 mm from the receiving medium over a total line length exceeding .13 inches. As a result, the computed beam radius which is nominally about 0.012 mm to the exp(−2) power points, varies less than 5% in size in the scan direction. In the cross-scan direction, the waist focus stays within ±0.35 mm from the receiving medium 24, and the beam radius, nominally about 0.015 mm, varies by less than 10% in this cross-scan direction. These properties of the laser beam 50 at the receiving medium 24 make it suitable to perform exceptionally high-resolution scanning.

The resolution obtained with optical scanner 10 is such that it can be used in creating a half-tone image, as would be formed, for example, by using a screen (not shown) having 150 dots per inch. The size of these equally spaced dots determines the apparent gray level of the image in any small region. Each dot could consist of a square 12 by 12 array of minipixels: in effect we would have eighteen hundred minipixels per inch, in both scan and cross-scan directions. By controlling the power level of the laser beam 50 as it writes each line, these minipixels are switched on and off, thereby altering the apparent size of each dot. The laser beam spot sizes, provided by the present invention are consistent with its use for this purpose.

Optical scanner 10 is also adapted to desensitize the system to the effects of small pyramidal angle errors on the individual facets 21 of the polygon 20. The effects of pyramidal angle errors are overcome in scanner 10 by making the reflecting facet 21 optically conjugate with the recording medium 24. Pyramidal angle errors will divert the reflected beam in the cross-scan direction. In general, this will cause the scanning spot at the receiving medium 24 to be displaced in the cross-scan direction and may produce a phenomenon known as banding when the scanner is used for "writing" an image. (In "reading" an image these cross-scan displacement errors are of less importance).

Polygon 20 is of a type which can be constructed, using known construction methods, with facet pyramidal angle errors of less than ±30 arc seconds. The tolerance on the amount of resulting cross-scan line separation error between adjacent scan lines will depend in part upon the total number of facets on the polygon and in part upon the assumed viewing distance. In the present invention, a polygon 20 having eight facets 21 can be used, and a viewing distance of not less than six inches can be assumed. Using such a polygon and viewing distance leads to a cross-scan line separation tolerance of 1.6% of the average line pitch. Assuming 1800 lines per inch this tolerance is 0.22 micrometers. As will be shown hereinafter, optical scanner 10 performs within this tolerance.

Optical scanner 10 has also been constructed to correct for the f-$\theta$ condition. Ideally, the image height H produced on the receiving medium 24 should be directly proportional to the scan angle $\theta$;

$$H = f\theta$$

where f is a constant equal to the focal length of the scanning optical system, and $\theta$ is given in radians. Also, the linear velocity of the spot should be directly proportional to the rotational velocity of the polygon 20;

$$V = \frac{dh}{dt} = f\frac{d\theta}{dt} = 2f\Omega$$

where $\Omega$ is the rotational speed of the polygon in radians/second.

Any deviation from the f-$\theta$ condition introduces geometrical distortion into the image and causes the spot velocity to vary. A variation in spot velocity would introduce a variation in energy density or exposure at the receiving medium 24 and, in the case of a minipixel might make the difference between producing an "on" condition and producing an "off" condition. It has been found that the optical scanner 10 causes less than 1% of geometrical distortion and less than 2.5% variation in spot velocity, and this is considered excellent performance.

Details of the elements in optical system 22 are shown in Table I.

TABLE I

| Surface | Curvature (mm$^{-1}$) | Thickness (mm) | Glass | Index at 830 nm |
| --- | --- | --- | --- | --- |
| Polygon | 0.0 | 40. | | |
| 40 | −.00655983 | 41.620 | 785.285 | 1.76300 |
| 42 | −.00669478 | 46.248 | | |
| 46 (Y-dir.) | 0.00207391 | 22.847 | 517.642 | 1.51021 |
| (X-dir.) | 0.0 | | | |
| 48 (Y-dir.) | 0.0 | 159.200 | | |
| (X-dir.) | 0.00463833 | | | |
| 35 (Y-dir.) | 0.0 | 150.752 | (Reflection) | |
| (X-dir.) | −.00497978 | | | |
| Image | 0.0 | 0.0 | | |

Notes:
1. The polygon has eight facets and is 120 mm in diameter flat to flat.
2. The plano mirror 36, shown in the figure is not included in Table I.
3. Surface 35 is a reflecting cylinder mirror which is tilted at 16.786° to the optical axis.
4. The receiving medium is located at the image surface.

In a representative example of the present invention, the laser beam 50 has a wavelength of 830 nm. Assuming the scan angle $\theta$ is zero, the entering laser beam is directed towards the center of a polygon facet 21, making an angle of 60° with the optical axis 23. After reflection at the polygon facet 21, the beam travels along the optical axis 23.

The entering beam 50 lies in the Y—Z (scan) plane. At the point where the beam 50 intersects a facet 21, the beam parameters are as follows:

In the Y (scan) direction

Beam exp(−2) radius = 7.7134 mm
Wavefront radius of curvature = 720 mm (i.e., a converging beam)
The beam is truncated at the exp(−2) power points at the collimator lens 16.

In the X (cross-scan) direction

Beam exp(−2) radius = 0.0306 mm

Wavefront radius of curvature = −12.342 mm

The beam is diverging from a waist located 0.94 mm before the polygon 20. The beam is not truncated.

Details of the laser beam 50 at the recording medium 24, assuming the scan angle $\theta$ is zero are as follows:

In the Y (scan) direction

Beam exp(−2) radius = 0.0119 mm (Excludes truncation effects)

Wavefront radius of curvature = infinite (i.e., at a beam waist)

In the X (cross-scan) direction

Beam exp(−2) radius = 0.0153 mm
Wavefront radius of curvature = −2.8664 mm

The beam is diverging from a waist located 0.25 mm before the image.

The following table, labelled Table II, provides some details on the performance of the system.

TABLE II

| SCAN ANGLE (DEG.) | CROSS SCAN IMAGE ERROR FOR PYRAMIDAL ANGLE ERROR OF | | EXP(−2) SPOT RADIUS AT IMAGE PLANE IN | | DISTANCE IMAGE TO BEAM WAIST IN | |
|---|---|---|---|---|---|---|
| | +30 ARC SEC. | −30 ARC SEC. | X-DIR. | Y-DIR. | X-DIR. | Y-DIR. |
| 23. | −0.000083 mm | 0.000093 mm | 0.0158 mm | 0.0122 mm | 0.3434 mm | −.0655 mm |
| 14. | −0.000037 | 0.000047 | 0.0146 | 0.0122 | −.0202 | −.0854 |
| 5. | 0.0 | 0.000011 | 0.0151 | 0.0119 | −.2210 | −.0152 |
| 0. | 0.000006 | 0.000006 | 0.0153 | 0.0119 | −.2500 | 0.0 |
| −4. | 0.000002 | 0.000010 | 0.0152 | 0.0119 | −.2324 | −.0083 |
| −13. | −.000026 | 0.000040 | 0.0146 | 0.0120 | −.0828 | −.0360 |
| −22. | −.000048 | 0.000063 | 0.0146 | 0.0122 | 0.1375 | 0.0608 |
| −27.2 | −.000018 | 0.000035 | 0.0149 | 0.0125 | 0.2219 | 0.1296 |
| −31. | 0.000052 | −.000033 | 0.0147 | 0.0121 | 0.2147 | 0.0426 |

A study of Table II will show that the worst cross-scan error occurs at a scan angle of 23°, where a deviation in line spacing of 0.000176 mm would occur if one polygon facet 21 were tilted 30 arc seconds in one direction and the next facet 21 were tilted 30 arc seconds in the opposite direction. This is within the required tolerance of 0.00022 mm needed to prevent banding. It is noted also that the focus error of the beam waist from the image plane, in the Y-direction is everywhere less than 0.13 mm. This illustrates the remarkably flat tangential field that is provided by the scanner of the present invention. In the X direction the location of the beam waist, relative to the image plane, has been placed at −0.25 mm at $\theta = 0$. For positive and negative values of $\theta$ the beam waist moves in the plus direction. This is an effect that cannot be counteracted, without introducing movable optical elements, and is due to the fact that, as the polygon rotates, the reflecting polygon facet 21 also moves along the optical axis.

As noted above, an important feature of the present invention is the extremely flat field which is obtained in scanner 10. One factor which contributes to achieving the flat field in scanner 10 is making the scan angle $\theta$ asymmetrical with respect to the optical axis 23. In the aforementioned patent application, entitled Optical Scanner, there is disclosed a scanner in which the scan angle is symmetrical with respect to the optical axis. In that scanner, the center of rotation of the polygon is displaced a small distance from the optical axis, in a direction parallel to a facet when oriented at a scan angle of $\theta = 0$, in order to prevent the beam from spilling over the trailing edge of the facet. In the present invention, this displacement is absent. Instead, the scan angle is caused to be asymmetrical. The angle $\theta$ varies from −31° to +23°, a total angular range of 54°, to scan a line image whose nominal length is 330.3 mm or about 13 inches. The polygon 20 rotates through an angle of 27° during the scan. At the polygon 20, each of the eight facets 21 subtends an angle of 45° and therefore, the polygon duty cycle is 0.6.

The invention has been described in detail with particular reference to a preferred embodiment thereof. But it will be understood that variations and modifications can be effected within the spirit and scope of the invention.

We claim:

1. An optical scanner for scanning a light beam generated by a light source onto a receiving medium, said scanner comprising:
    deflector means for scanning said beam through a predetermined angle; and
    optical means interposed between said deflector means and said receiving medium, said optical means comprising a first lens element having two spherical surfaces, a second lens element having two cylindrical surfaces which are oriented perpendicular to each other, and a cylindrical mirror disposed along an optical axis.

2. An optical scanner, as defined in claim 1, wherein said deflector means comprises a polygon rotatable about an axis of rotation.

3. An optical scanner, as defined in claim 1, wherein an input beam to said deflector means is converging in the scan direction.

4. An optical scanner, as defined in claim 1, wherein a plano mirror is interposed between said second lens element and said cylindrical mirror.

5. An optical scanner, as defined in claim 1, wherein said beam has a spot size at the receiving medium of a size which is suitable for producing half-tone images.

6. An optical scanner, as defined in claim 1, wherein said deflector means is located relative to said optical axis such that a greater portion of said angle is located on one side of said optical axis than on an opposite side thereof.

7. An optical scanner, as defined in claim 6 wherein said angle is about 54°.

8. An optical scanner, as defined in claim 7, wherein said deflector is scanned through an angle of about 31° on said one side of said optical axis and about 23° on said opposite side.

* * * * *